United States Patent
Song et al.

(10) Patent No.: US 8,448,613 B2
(45) Date of Patent: May 28, 2013

(54) 8-STROKE INTERNAL COMBUSTION ENGINE

(76) Inventors: Kwang Jae Song, Seoul (KR); Se Jin Song, Seoul (KR)

(*) Notice: Subject to any disclaimer, the term of this patent is extended or adjusted under 35 U.S.C. 154(b) by 411 days.

(21) Appl. No.: 12/933,408

(22) PCT Filed: Mar. 9, 2009

(86) PCT No.: PCT/KR2009/001168
§ 371 (c)(1),
(2), (4) Date: Sep. 17, 2010

(87) PCT Pub. No.: WO2009/116741
PCT Pub. Date: Sep. 24, 2009

(65) Prior Publication Data
US 2011/0017170 A1    Jan. 27, 2011

(30) Foreign Application Priority Data

Mar. 17, 2008 (KR) .................. 10-2008-0024307

(51) Int. Cl.
*F02B 47/02* (2006.01)
(52) U.S. Cl.
USPC ............. 123/25 C; 123/25 P; 123/64; 60/712
(58) Field of Classification Search
USPC ...................... 123/25 C, 25 P, 64; 60/712
See application file for complete search history.

(56) References Cited

U.S. PATENT DOCUMENTS

| | | | | |
|---|---|---|---|---|
| 1,217,788 | A * | 2/1917 | Liedtke | 60/712 |
| 4,143,518 | A * | 3/1979 | Kellogg-Smith | 60/712 |
| 4,805,571 | A * | 2/1989 | Humphrey | 123/316 |
| 5,732,677 | A * | 3/1998 | Baca | 123/316 |
| 6,637,382 | B1 | 10/2003 | Brehob et al. | |
| 7,367,306 | B1 * | 5/2008 | Holden | 123/250 |
| 8,215,280 | B2 * | 7/2012 | Furr | 123/197.4 |
| 2009/0039301 | A1 * | 2/2009 | Midorikawa | 251/129.15 |

FOREIGN PATENT DOCUMENTS

| | | |
|---|---|---|
| DE | 4115727 A1 * | 1/1992 |
| JP | 09-144606 | 3/1997 |
| JP | 2004-218557 | 5/2004 |

OTHER PUBLICATIONS

International Search Report for PCT/KR2009/001168 mailed Oct. 22, 2009.
International Preliminary Report on Patentability Chapter II for PCT/KR2009/001168.

* cited by examiner

*Primary Examiner* — Noah Kamen
*Assistant Examiner* — Grant Moubry
(74) *Attorney, Agent, or Firm* — Christopher Paul Mitchell

(57) ABSTRACT

An 8-stroke internal combustion engine which generates power in a highly efficient manner by injecting water such that the combustion gas is re-circulated, retaken into a cylinder block and recompressed immediately after 4-strokes resulting from the burning of fuel such that 4-strokes resulting from the combustion of fuel and 4-strokes resulting from the evaporation and volume expansion of injected water are alternately repeated.

13 Claims, 15 Drawing Sheets

Fig. 11

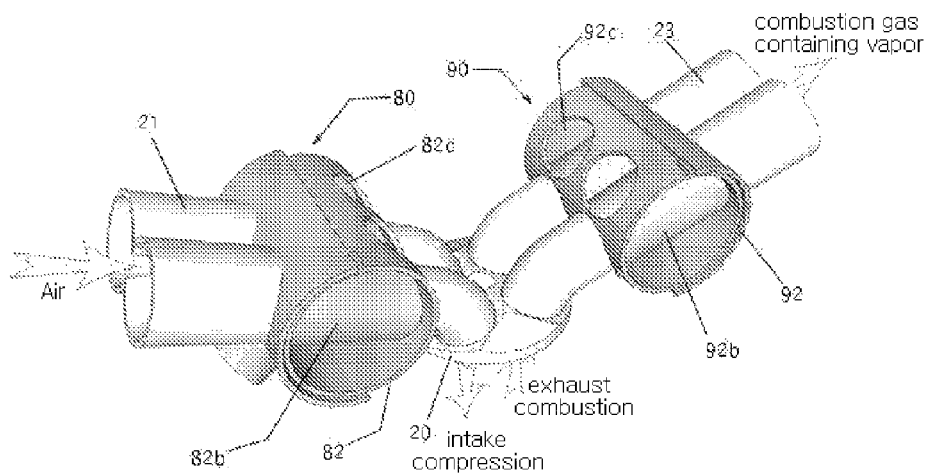

Fig. 12

| item | 8-stroke | | | | | | | |
|---|---|---|---|---|---|---|---|---|
| | 4-stroke due to combustion | | | | 4-stroke due to evaporation of water | | | |
| | intake | compression | combustion | exhaust | re-intake | recompression | expansion | re-exhaust |
| 1 | intake of air | | | | | | | |
| 2 | | compression | | | | | | |
| 3 | | | combustion | | | | | |
| 4 | | | | exhaust of combustion gas | | | | |
| 5 | | | | | intake of combustion gas | | | |
| 6 | | | | | | compression of combustion gas | | |
| 7 | | | | | | | vapor explosion | |
| 8 | | | | | | | | final exhaust of exhaust gas | ignition cycle water injection cycle

8-STROKE INTERNAL COMBUSTION ENGINE

RELATED APPLICATIONS

This application is a 371 application of International Application No. PCT/KR2009/001168, filed Mar. 9, 2009, which in turn claims priority from Korean Patent Application No. 10-2008-0024307, filed Mar. 17, 2008, both of which are incorporated herein by reference in their entireties.

TECHNICAL FIELD

The present invention relates to an internal combustion engine that can increases fuel efficiency by alternately repeating power generation using combustion of fuel and evaporation and expansion of injected water.

BACKGROUND ART

In general, internal combustion engines generate power by rotating the crankshaft while repeating four strokes composed of intake, compression, ignition or explosion due to fuel injection, and exhaust of a gas mixture or air. However, when the four strokes are continuously repeated, the fuel is continuously consumed for each four-stroke, such that fuel consumption increases, while the top of the cylinder block is exposed to significantly high temperature due to explosion repeated one time for each four-stroke. Accordingly, it is considerably difficult to cool the cylinder block and environmental pollutants are discharged with the exhaust gas.

A 6-stroke internal combustion engine has been proposed to overcome those problems, which uses power alternately generated by combustion of the fuel and by evaporation and expansion of injected water, by injecting water right into the cylinder block at relatively high temperature due to combustion of the fuel, right after the exhaust stroke.

According to the 6-stroke internal combustion engine in which intake, compression, explosion, exhaust, expansion, and re-exhaust strokes are sequentially repeated, since the fuel is consumed one time for not each four-stroke, but each six-stroke, fuel consumption can be considerably reduced in comparison to the 4-stroke internal combustion engine. Further, since water is injected into the cylinder block heated at high temperature by combustion of the fuel, the cylinder block is automatically cooled and the temperature of the exhaust gas is also decreased, such that it is possible to reduce to amount of environmental pollutants, such as $NO_x$, which are produced in the exhaust gas.

However, the 6-stroke internal combustion engine having the configuration described above should generate power, using only expansion due to evaporation of the water, after generating by using combustion of the fuel. Therefore, the force produced by the expansion due to evaporation of the water is not enough to push the piston, such that sufficient power is not generated.

Further, in the 6-stroke internal combustion engine of the related art, thermal efficiency decreases, because the high-temperature exhaust gas produced by combustion of the fuel is discharged without being re-circulated.

In addition, the 6-stroke internal combustion engine of the related art usually injects water by using an electronic valve, and in this case reliability of water injection timing is deteriorated.

DISCLOSURE

Technical Problem

It is an object of the present invention to provide an 8-stroke internal combustion engine that can considerably increase fuel efficiency, by alternately repeating four strokes due to combustion of the fuel and four strokes due to evaporation and expansion of injected water to generate power.

It is another object of the present invention to provide an 8-stroke internal combustion engine that can significantly increase thermal efficiency by re-circulating the combustion gas right after four strokes due to combustion of the fuel and re-taking and recompressing the combustion gas in the cylinder block, and then injecting water to consistently generate power of a predetermined level, while collecting waste heat from the combustion gas.

It is another object of the present invention to provide an 8-stroke internal combustion engine that can considerably increase reliability of water injection timing, by using a relatively simple mechanical mechanism that is operated with rotation of the crankshaft.

Technical Solution

The objects of the present invention are accomplished by providing an 8-stroke internal combustion engine, which includes: a cylinder block in which rotational power is generated by a crankshaft rotated by up-down reciprocation of a piston that is transmitted through a connecting rod; a cylinder head connected to the top of the cylinder block and having one side connected with an intake manifold opened/closed by intake valves and the other side connected with exhaust manifolds opened/closed by an exhaust valve; a first camshaft arranged above the cylinder head, rotating with the rotation of the crankshaft, and having integral intake cams operating the intake valves; a second camshaft arranged above the cylinder head, rotating with the rotation of the crankshaft, and having integral exhaust cams operating the exhaust valves; a water injection unit disposed above the cylinder head and injecting water into the cylinder block; a third camshaft arranged above the cylinder head, rotating with the rotation of the first camshaft, and having a injection mechanism operating the water injection unit; combustion gas bypass pipes connecting the intake manifold with the exhaust manifold; a combustion gas intake controller disposed in the intake manifold and connected with the combustion gas bypass pipe to selectively controls intake of a gas mixture or air or re-intake of combustion gas; and a combustion gas exhaust controller disposed in the exhaust manifold and connected with the combustion gas bypass pipe to selectively control exhaust or re-circulation of combustion gas.

According to a preferred feature of the present invention, an ignition plug or a fuel injector is disposed at the center of the cylinder head.

According to a more preferred feature of the present invention, the first camshaft and the second camshaft are rotated with the rotation of the crankshaft by a first power transmission mechanism including a first sprocket fixed to the crankshaft, a second sprocket fixed to the first camshaft, a third sprocket fixed to the second camshaft, and a power chain linking the sprockets.

According to a more preferred feature of the present invention, as the second and third sprockets rotate one time for two-time rotation of the first sprocket, the first camshaft and the second camshaft rotate one time with two-time rotation of the crankshaft.

According to a more preferred feature of the present invention, the third camshaft is rotated with the rotation of the first camshaft by a second power transmission mechanism including a first gear fixed to the first camshaft and a second gear fixed to the third camshaft and engaged with the first gear.

According to a more preferred feature of the present invention, as the second gear rotates one time for two-time rotation of the first gear, the third camshaft is rotated one time with two-time rotation of the first camshaft.

According to a more preferred feature of the present invention, the combustion gas intake controller includes: a first semicircular plate fixed to one side of the intake manifold; a first rotating drum rotatably fitted on a first rotating shaft while being externally tangent between the first semicircular plate and the other side of the intake manifold, having a first communicating pipe therein for selectively communicating both sides of the intake manifold in accordance with the rotational direction, and having first communication holes selectively communicating the combustion bypass pipe with the other side of the intake manifold in accordance with the rotational direction, through the outer circumference; and a first actuator rotating the first rotating drum by rotating the first rotating shaft of the first rotating drum.

According to a more preferred feature of the present invention, the first actuator includes: a first spur gear fixed to the first rotating shaft of the first rotating drum; an intake control cam integrally formed with the third camshaft; an intake control rod elastically biased by a coil spring such that one end is in contact with the intake control cam, and linearly moved by the rotation of the third camshaft; and a first rack gear integrally formed at the other end of the intake control rod and engaged with the first spur gear.

According to a more preferred feature of the present invention, the combustion gas exhaust controller includes: a second semicircular plate fixed to one side of the exhaust manifold and communicating with the combustion gas bypass pipe; a second rotating drum rotatably fitted on a second rotating shaft while being externally tangent between the second semicircular plate and the other side of the exhaust manifold, having a second communicating pipe therein for selectively communicating both sides of the exhaust manifold in accordance with the rotational direction, and having second communication holes selectively communicating the combustion bypass pipe with the other side of the exhaust manifold in accordance with the rotational direction, through the outer circumference; and a second actuator connected to the second rotating shaft and rotating the second rotating drum.

According to a more preferred feature of the present invention, the second actuator includes: a second spur gear fixed to the second rotating shaft of the second rotating drum; the exhaust control cam integrally formed with the third camshaft; an exhaust control rod elastically biased by a coil spring such that one end is in contact with the exhaust control cam, and linearly moved by the rotation of the third camshaft; and a second rack gear integrally formed at the other end of the exhaust control rod and engaged with the second spur gear.

According to a more preferred feature of the present invention, the water injection unit includes: an injection cylinder disposed on the cylinder head and having one side connected with a water supply and having the lower end where an injection nozzle is disposed; and a nozzle opening/closing rod rotatably combined with the injection cylinder and elastically biased in the closing direction of the injection nozzle while rotating to close the injection nozzle with operation of a water injection operating mechanism.

According to a more preferred feature of the present invention, the water injection operating mechanism has a protrusion protruding from one side of the top of the nozzle opening/closing rod and a trigger formed on the intake control cam and rotating the nozzle opening/closing rod by pushing the protrusion in accordance with the rotation of the intake control cam.

According to a more preferred feature of the present invention, the rigger rotates the nozzle opening/closing rod to open the injection nozzle, after re-intake and recompression of the re-circulated combustion gas is completed in the cylinder block.

Advantageous Effects

According to the 8-stroke internal combustion engine of the present invention, power is generated by four strokes due to combustion of the fuel and four strokes due to evaporation and expansion of injected water which are alternately repeated, such that it is possible to considerably increase fuel efficiency in comparison with 4-stroke or 6-stroke internal combustion engines in the relates art.

Further, the same power as the four strokes due to the evaporation and the expansion of the injected water is generated in the four strokes due to the combustion of the fuel, by re-circulating, re-taking, and recompressing the combustion gas and then injecting the water, right after the four strokes due to the combustion of the fuel; therefore, it is possible to continuously generate a predetermined level of power, even if the four strokes due to the combustion of the fuel and the four strokes due to the evaporation and expansion of the injected water are alternately repeated.

Furthermore, it is possible significantly increase thermal efficiency by collecting waste heat from the combustion gas by re-circulating the combustion gas right after the four strokes due to the combustion of the fuel.

Further, since the water injection unit, which operates with rotation of the crankshaft, injects water only when the re-circulated combustion gas is compressed, by using relatively simple mechanism, it is possible to prevent malfunction and considerably increase reliability in water injection timing.

DESCRIPTION OF DRAWINGS

FIGS. 9 to 11 are views illustrating the operation of a combustion gas intake controller and a combustion gas exhaust controller in the 8-stroke internal combustion engine according to the present invention;

FIG. 12 is a flowchart illustrating the strokes of the 8-stroke internal combustion engine according to the present invention.

BEST MODE

Hereinafter, preferred embodiments of the present invention are described in detail with reference to the accompanying drawings. The embodiments are provided to explain in detail the present invention such that those skilled in the art can easily implement the present invention and do not limit the spirit and scope of the present invention.

Figure 1:
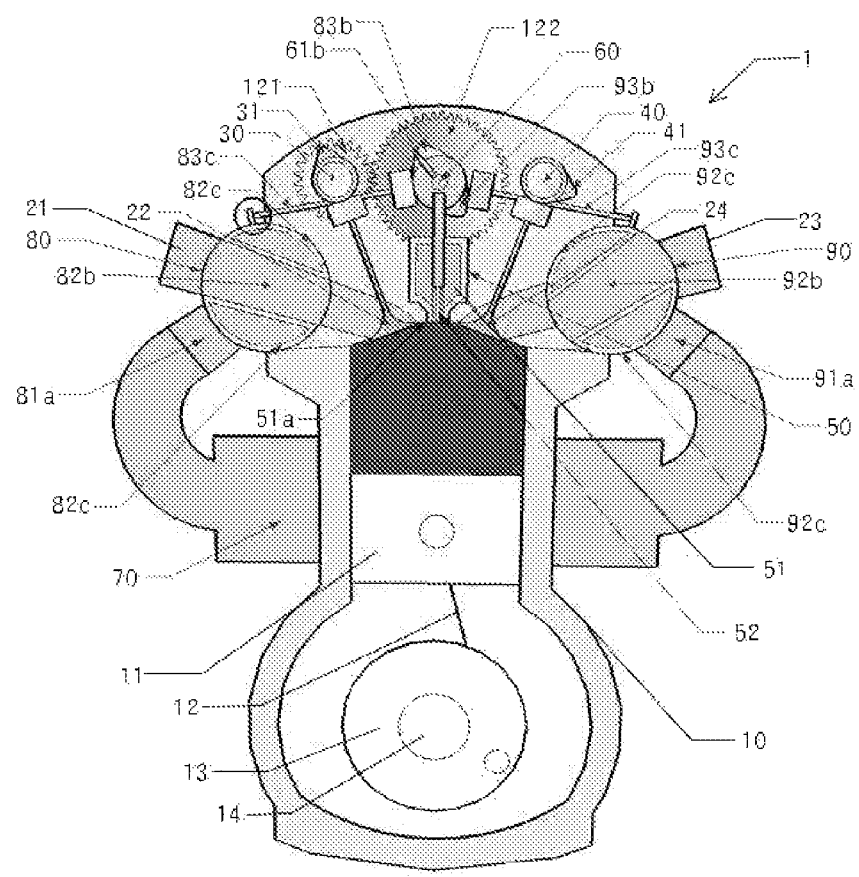
FIG. 1 is a view schematically showing the structure of an 8-stroke internal combustion engine according to the present invention.
Figure 2:
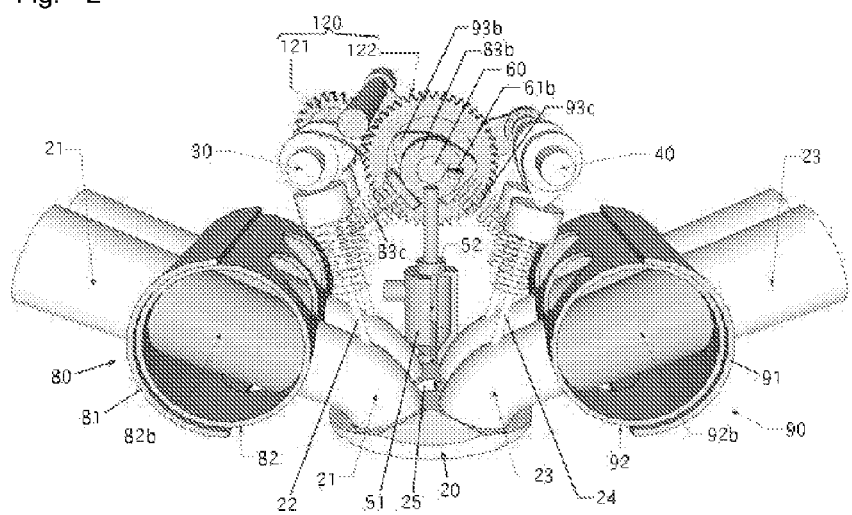
FIGS. 2 and 3 are view showing the upper structure of the 8-stroke internal combustion engine according to the present invention.
Figure 3:
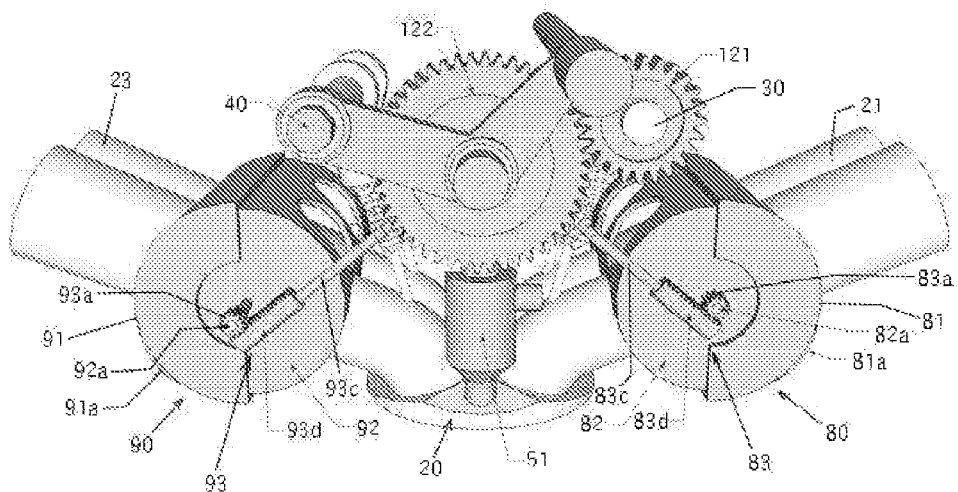
Figure 4:
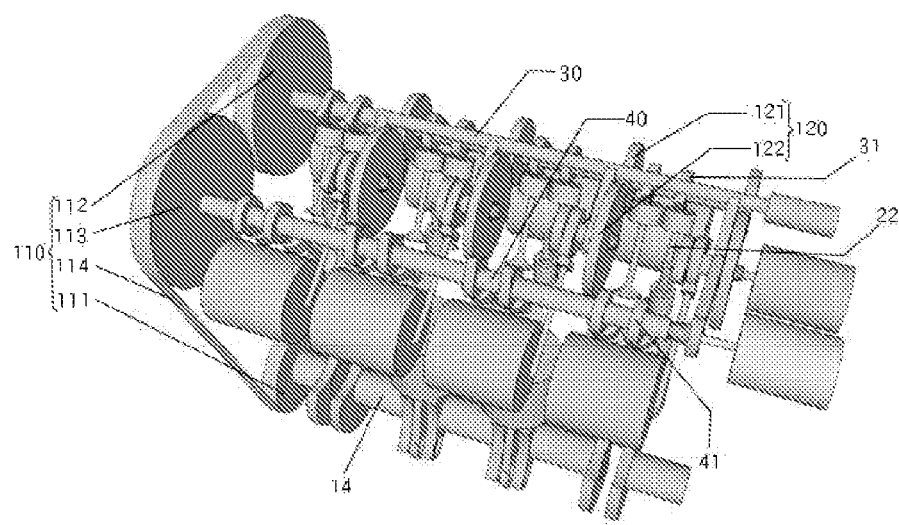
FIG. 4 is a view showing the interoperation of a crankshaft, and first, second, and third camshafts in the 8-stroke internal combustion engine according to the present invention.
Figure 5:
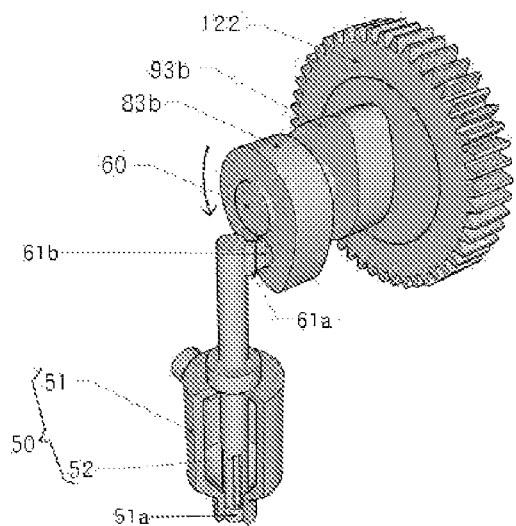
FIGS. 5 and 6 are views illustrating the operation of a water injection unit in the 8-stroke internal combustion engine according to the present invention.
Figure 6:
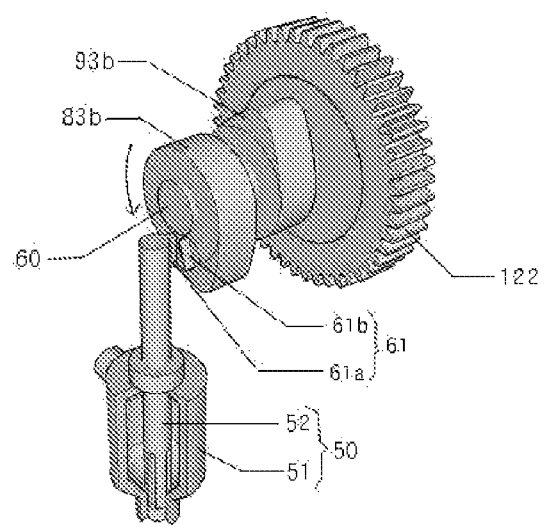
Figure 7:
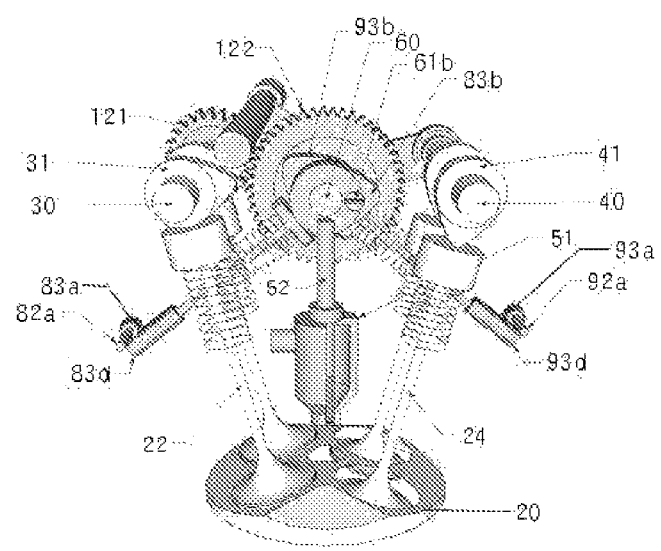
FIGS. 7 and 8 are views illustrating the operation of an intake valve, an exhaust valve, and first and second actuator in the 8-stroke internal combustion engine according to the present invention.
Figure 8:
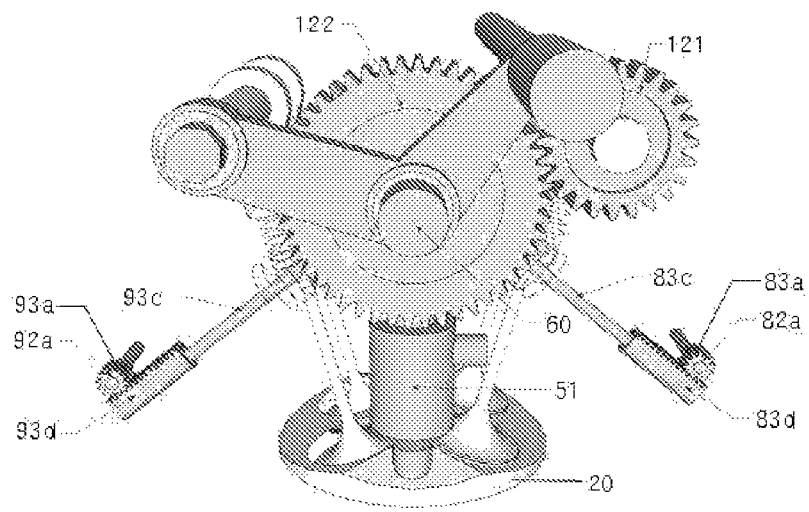
Figure 9:
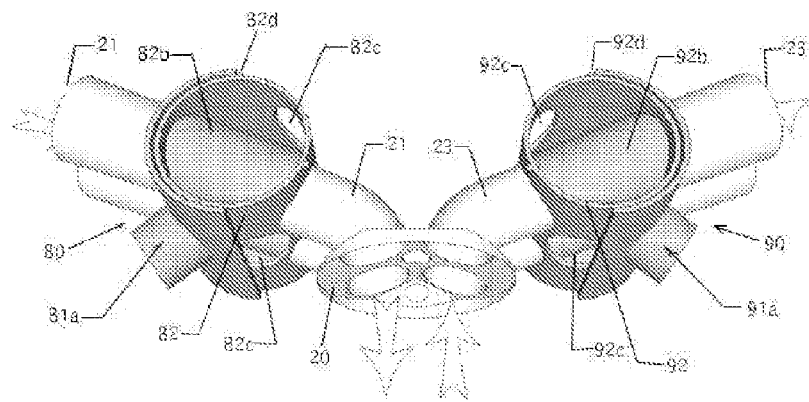
Figure 10:
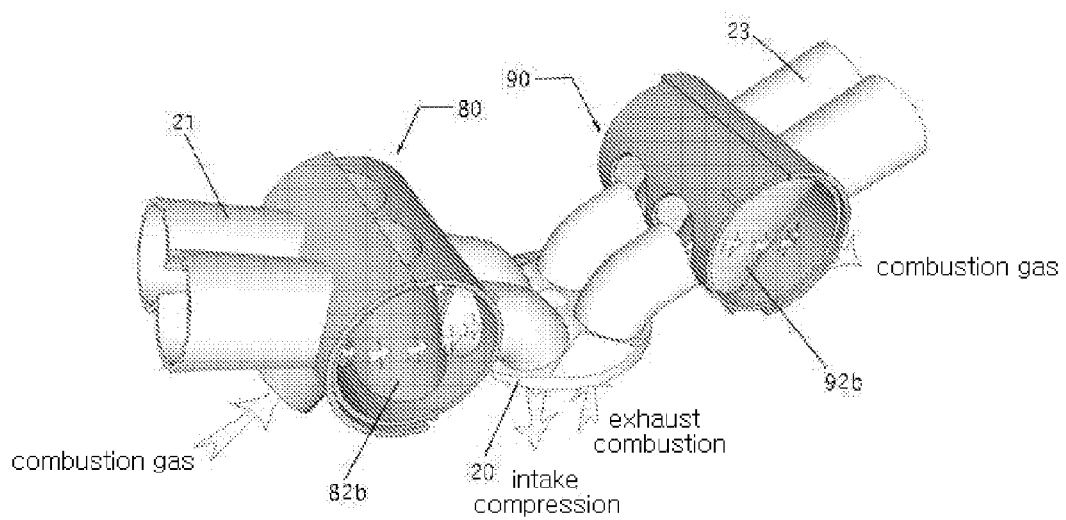

FIG. 1 is a view schematically showing the structure of an 8-stroke internal combustion engine according to the present invention, FIGS. 2 and 3 are view showing the upper structure of the 8-stroke internal combustion engine according to the present invention, FIG. 4 is a view showing the interoperation of a crankshaft, and first, second, and third camshafts in the 8-stroke internal combustion engine according to the present invention, FIGS. 5 and 6 are views illustrating the operation of a water injection unit in the 8-stroke internal combustion engine according to the present invention, FIGS. 7 and 8 are views illustrating the operation of an intake valve, an exhaust valve, and first and second actuator in the 8-stroke internal combustion engine according to the present invention, and FIGS. 9 to 11 are views illustrating the operation of a combustion gas intake controller and a combustion gas exhaust controller in the 8-stroke internal combustion engine according to the present invention.

An 8-stroke internal combustion engine 1 according to the present invention can generate power at high efficiency by alternately repeating four strokes due to combustion of the fuel and four strokes due to evaporation and expansion of injected water while re-circulating combustion gas, re-taking and recompressing the combustion gas in a cylinder block and then injecting water, right after the four strokes due to combustion of the fuel, and as shown in FIGS. 1 to 12, includes: a cylinder block 10 in which rotational power is generated by a crankshaft 14 rotated by up-down reciprocation of a piston 11 that is transmitted through a connecting rod 12; a cylinder head 20 connected to the top of the cylinder block 10 and having one side connected with an intake manifold 21 opened/closed by intake valves 22 and the other side connected with exhaust manifolds 23 opened/closed by an exhaust valve 24; a first camshaft 30 arranged above the cylinder head 20, rotating with the rotation of the crankshaft 14, and having integral intake cams 31 operating the intake valves 22; a second camshaft 40 arranged above the cylinder head 20, rotating with the rotation of the crankshaft 14, and having integral exhaust cams 41 operating the exhaust valves 24; a water injection unit 50 disposed above the cylinder head 20 and injecting water into the cylinder block 10; a third camshaft 60 arranged above the cylinder head 20, rotating with the rotation of the first camshaft 30, and having an integral water injection mechanism 61 operating the water injection unit 50; combustion gas bypass pipes 70 connecting the intake manifold 21 with the exhaust manifold 23; a combustion gas intake controller 80 disposed in the intake manifold 21 and connected with the combustion gas bypass pipe 70 to selectively controls intake of a gas mixture (for a gasoline engine) or air (for diesel engine) or re-intake of combustion gas; and a combustion gas exhaust controller 90 disposed in the exhaust manifold 23 and connected with the combustion gas bypass pipe 70 to selectively control exhaust or re-circulation of combustion gas.

In this configuration, the cylinder block 10 provides a space where the combustion of the fuel and the evaporation of the water alternately occur and guide the piston 11 reciprocating up/down, which the piston 11 is connected to be able to reciprocate up/down, one end of the connecting rod 12 is connected to the lower portion of the piston, one side of the crank 13 is connected to the other end of the connecting rod 12, and the crankshaft 14 rotatably combined with the cylinder block 10 is integrally fitted in the crank 13, such that the up-down reciprocation of the piston 11 is transmitted through the connecting rod 12 and rotates the crank shaft 14, thereby generating rotational power.

The cylinder head 20 is connected to the cylinder block 10 to supply a gas mixture, air, or combustion gas and discharge the combustion gas such that combustion of the fuel and evaporation of the water alternately occur while keep the upper portion of the cylinder block 10 airtight, and has one side connected with the intake manifold 21 that is opened/closed by the intake valves 22 and takes a gas mixture or air into the cylinder block 10 to re-takes the combustion gas into the cylinder block 10, the other side connected with the exhaust manifold 23 that is opened/closed by the exhaust valves 24 and discharge the combustion gas or combustion gas containing vapor outside the cylinder block 10, and the center where an ignition plug (not shown) that ignites by artificially making flame when the intake gas mixture is compressed is provided (for a gasoline engine) or a fuel injector (not shown) that injects fuel to explode when the intake air is compressed (for a diesel engine). The intake valves 22 are elastically biased to close the intake manifold 21 by springs etc., and the exhaust valves 24 are elastically biased to close the exhaust manifold 23 by springs etc. The ignition plug or the fuel injector, which is not shown in the drawings, is fitted in a hole 25 formed at the center of the cylinder head 20.

It is preferable that the intake manifold 21 and the exhaust manifold make a pair of two pieces adjacent each other to increase intake and exhaust efficiency, in which the intake valves 22 and the exhaust valves 24 respectively make a pair, and though described below, the intake cams 31 and the exhaust cams 41 make a pair, respectively.

The first camshaft 30 is disposed above the cylinder head 20 described above. The first camshaft 30 rotates with the rotation of the crankshaft 14 and has the intake cams 31 integrally formed to push the intake valves 22 while integrally rotating with the rotation of the firs cam shaft 30 such that the intake manifold 21 is opened and intake stroke of a gas mixture or air and re-intake stroke of combustion gas can occur.

The second cam shaft 40 is disposed in parallel with the first camshaft 30 above the cylinder head 20 described above. The second camshaft 40 rotates with the rotation of the crankshaft 14 and has the exhaust cams 41 integrally formed to push the exhaust valves 24 while integrally rotating with the rotation of the crankshaft 14 such that the exhaust manifold 23 is opened and the exhaust stroke of the combustion gas or the re-exhaustion stroke of the combustion gas contained with vapor can occur.

The first camshaft 30 and the second camshaft 40 are rotated with the rotation of the crankshaft 14 by a first power transmission mechanism 110 and the first power transmission mechanism 110, as shown in FIG. 4, includes a first sprocket 111 fixed to the crankshaft 14, a second sprocket 112 fixed to the first camshaft 30, a third sprocket 113 fixed to the second camshaft 40, and a power chain 114 linking the sprockets 111, 112, 113.

The first camshaft 30 rotates with the rotation of the cranks shaft 14 such that it rotates one time for two-time rotation of the crankshaft 14, as the second sprocket 112 rotates one time for two-time rotation of the first sprocket 111, in order that the intake stroke of a gas mixture of air and the re-intake stroke of combustion gas occurs one time for each four-stroke, respectively, in the entire eight strokes that is made by four-time rotation of the crankshaft 14.

The second camshaft 40 rotates with the rotation of the cranks shaft 14 such that it rotates one time for two-time rotation of the crankshaft 14, as the third sprocket 113 rotates one time for two-time rotation of the first sprocket 111, in order that the exhaust stroke of combustion gas or the re-exhaustion stroke of combustion gas containing vapor occurs one time for each four-stroke, respectively, in the entire eight strokes that is made by four-time rotation of the crankshaft 14.

Further, the maximum diameter points of the intake cams 31 on the first camshaft 30 and the exhaust cams 41 on the second camshaft 40 are spaced at 270° from each other in the rotational direction, such that the intake stroke of gas mixture or air is made by the intake cams 31 and the exhaust stroke of combustion gas is made by the exhaust cams 41 after three strokes, while the re-intake stroke of combustion gas is made by the intake cams 31 and the re-exhaust stroke of combustion gas containing vapor is made by the exhaust cams 41 after three strokes.

The water injection unit 50 is disposed above the cylinder head 20 described above and the water injection unit 50 injects water into the cylinder block 10 after combustion gas is re-circulated, and re-taken and recompressed in the cylinder block 10 such that power is generated by evaporation and expansion of the water, after power is generated by combustion of the fuel. The water injection unit, as shown in FIGS. 1, 5, and 6, includes: an injection cylinder 51 disposed on the cylinder head 20 and having one side connected with a water supply (not shown) and having the lower end where an injection nozzle 51a aligned into the cylinder block 10 is disposed; and a nozzle opening/closing rod 52 rotatably combined with the injection cylinder 51 and elastically biased in the closing direction of the injection nozzle 51a while rotating to close the injection nozzle 51a by a water injection operating mechanism 61, which is described below.

The third camshaft 60 is disposed above the cylinder head 20 described above and the third camshaft rotates with the rotation of the first camshaft 30, and controls the operation of the combustion gas intake controller 80 and the combustion gas exhaust controller 90 while operating the water injection operating mechanism 61 such that water can be injected into the cylinder block 10. The water injection operating mechanism 61, which operates the water injection unit 50, right after re-intake and recompression of the re-circulated combustion gas in the cylinder block 10 while integrally rotating with the third camshaft 60, is disposed on the third camshaft 60.

It is preferable that the third camshaft 60 positioned between the first camshaft 30 and the second camshaft 40 is biased to one side from the center of the cylinder head 20 such that the ignition plug or the fuel injector can be installed at the center of the cylinder head 20.

Further, the third camshaft 60 is rotated with the rotation of the first camshaft 30 by a second power transmission mechanism 120 and the second power transmission mechanism 120, as shown in FIGS. 1 to 3, includes a first gear 121 fixed to the first camshaft 30 and a second gear 122 fixed to the third camshaft 60 and engaged with the first gear 121.

The gear ratio of the first gear 121 and the second gear 122 is 1:2 such that the third camshaft 60 rotates one time for the entire eight strokes made by four-time rotation of the crankshaft 14 and the water injection unit 50 correspondingly operates only one time, such that as the second gear 122 rotates one time for two-time rotation of the first gear 121, the third camshaft 60 rotates with the rotation of the first camshaft 30 to rotate one time for two-time rotation of the first camshaft 30 by the second power transmission mechanism 120.

The water injection operating mechanism 61 operates with the operation of an intake control cam 83b, which is described below, and thus described in detail when the intake control cam 83b is described.

The intake manifold 21 and the exhaust manifold 23 are connected with the combustion gas bypass pipe 70, as described above, in which the combustion gas bypass pipe 70 provides a channel that allows the gas mixture or air taken in the cylinder block 10 through the intake manifold 21 to be re-circulated into the intake manifold 21 and re-taken into the cylinder block 10, without being directly discharged, when being discharged as combustion gas through the exhaust manifold 23 after compression and explosion.

One end of the combustion gas bypass pipe 70 is connected to the combustion gas intake controller 80, which is described below, and the other end of the combustion gas bypass pipe 70 is connected to the combustion gas exhaust controller 90, which is described below.

The combustion gas intake controller 80 is disposed at the joint of the intake manifold 21 and the combustion gas bypass pipe 70. The combustion gas intake controller 80 selectively changes the path from the intake manifold 21 or the combustion gas bypass pipe 70 to the cylinder block 10 so that the intake manifold 21 communicates with the cylinder block 10 such that a gas mixture or air is taken into the cylinder block 10 in the intake stroke, and the combustion gas bypass pipe 70 communicates with the cylinder block 10 such that combustion gas is re-taken into the cylinder block 10 in the re-intake stroke. The combustion gas intake controller 80, as shown in FIGS. 2, 3, and 9 to 11, includes: a first semicircular plate 81 fixed to one side of the intake manifold 21 and having a first connecting pipe 81a connected with the combustion gas bypass pipe 70; a first rotating drum 82 rotatably fitted on a first rotating shaft 82a while being externally tangent between the first semicircular plate 81 and the other side of the intake manifold 21, having a first communicating pipe 82b therein for selectively communicating both sides of the intake manifold 21 in accordance with the rotational direction, and having first communication holes 82c selectively communicating the combustion bypass pipe 70 with the other side of the intake manifold 21 in accordance with the rotational direction, through the outer circumference; and a first actuator 83 rotating the first rotating drum 82 by rotating the first rotating shaft 82a of the first rotating drum 82.

The first communication holes 82c are formed at both sides, the first communication hole 82c at one side can communicate with the first connecting pipe 81a and the communication hole 82c at the other side can communicate with the other side of the intake manifold 21.

It is very important to keep airtightness in the operation of the combustion gas intake controller 80, for this configuration, it is preferable that both ends of the first communication pipe 82b hermetically communicate with both sides of the intake manifold 21 in accordance with rotation of the first rotating drum 82, and the first communication holes 82c hermetically communicate with the first connecting pipe 81a of the first semicircular plate 81 and the other side of the intake manifold 21, respectively, in accordance with the rotation of the first rotating drum 82.

Further, it is preferable that a first stopper 82d that restricts rotational range in both directions in contact with the first semicircular plate 81 in accordance with rotation by the first actuator 83 is formed on the outer circumference of the first rotating drum 82.

The first actuator 83 rotating the first rotating drum 82 in both directions, as shown in FIGS. 2 and 3, includes: a first spur gear 83a fixed to the first rotating shaft 82a of the first rotating drum 82; the intake control cam 83b integrally formed with the third camshaft 60; an intake control rod 83c elastically biased by, for example, a coil spring such that one end is in contact with the intake control cam 83b, and linearly moved by the rotation of the third camshaft 60; and a first rack gear 83d integrally formed at the other end of the intake control rod 83c and engaged with the first spur gear 83a.

Accordingly, as the third camshaft 60 rotates, the intake control cam 83b integrally formed thereto rotates, the intake control rod 83c that is in close contact with the intake control cam 83b linearly moves with the first rack gear 83d at the end linearly moving, the first spur gear 83a fixed to the first rotation shaft 82a of the first rotating drum 82 is rotated alternately in both directions by the linear movement of the first rack gear 83d, and the first rotating drum 82 rotates between the first semi-circular plate 81 and the other side of the intake manifold 21, such that the intake manifold 21 communicates with the cylinder block 10 and a gas mixture or air is taken into the cylinder block in the intake stroke, while the combustion gas bypass pipe 70 communicates with the cylinder block 10 and the combustion gas is re-taken into the cylinder block in the exhaust stroke.

The water injection operating mechanism 61 of the third camshaft 60 described above operates with the operation of the intake control cam 83b of the first actuator 83. The water injection operating mechanism 61, as shown in FIGS. 5 and 6, has a protrusion 61a protruding from one side of the top of the nozzle opening/closing rod 52 and a trigger 61b formed on the intake control cam 83b and rotating the nozzle opening/closing rod 52 by pushing the protrusion 61a in accordance with the rotation of the intake control cam 83b.

The trigger 61b rotates the nozzle opening/closing rod 52 to open the injection nozzle 51a, only right after re-intake and recompression of the re-circulated combustion gas is completed in the cylinder block 10, such that water is injected into the cylinder block 10 by the water injection unit 50 only after recompression of the combustion gas is completed during the entire eight strokes made by four-time rotation of the crankshaft 14.

The combustion gas exhaust controller 90 is disposed at the joint of the exhaust manifold 23 and the combustion gas bypass pipe 70, which is described above. The combustion gas exhaust controller 90 selectively changes the path from the cylinder block 10 to the combustion gas bypass pipe 70 or the exhaust manifold 23 so that the combustion gas bypass pipe 70 communicates with the cylinder block 10 such that combustion gas is re-circulated through the combustion gas bypass pipe 70 in the intake stroke, while the exhaust manifold 23 communicates with the cylinder block 10 such that combustion gas containing vapor is consequently discharged through the exhaust manifold 23 in the exhaust stroke. The combustion gas exhaust controller 90, as shown in FIGS. 2, 3 and 9 to 11, includes: a second semicircular plate 91 fixed to one side of the exhaust manifold 23 and having a second connecting pipe 91a connected with the combustion gas bypass pipe 70; a second rotating drum 92 rotatably disposed by a second rotating shaft 92a while being externally tangent between the second semicircular plate 91 and the other side of the exhaust manifold 23, having a second communicating pipe 92b therein for selectively communicating both sides of the exhaust manifold 23 in accordance with the rotational direction, and having second communication holes 92c selectively communicating the combustion bypass pipe 70 with the other side of the exhaust manifold 23 in accordance with the rotational direction, through the outer circumference; and a second actuator 93 connected to the second rotating shaft 92c and rotating the second rotating drum 92.

The second communication holes 92c are formed at both sides, the second communication hole 92c at one side can communicate with the second connecting pipe 91a and the communication hole 92c at the other side can communicate with the other side of the exhaust manifold 23.

It is very important to keep airtightness in the operation of the combustion gas exhaust controller 90, for this configuration, it is preferable that both ends of the second communication pipe 92b hermetically communicate with both sides of the exhaust manifold 23 in accordance with rotation of the second rotating drum 92, and the second communication holes 92c hermetically communicate with the second connecting pipe 91a of the second semicircular plate and the other side of the exhaust manifold 23, respectively, in accordance with the rotation of the first rotating drum 92.

Further, it is preferable that a second stopper 92d that restricts rotational range in both directions in contact with the second semicircular plate 91 in accordance with rotation by the second actuator 93 is formed on the outer circumference of the second rotating drum 92.

The second actuator 93 rotating the second rotating drum 92 in both directions, as shown in FIGS. 2 and 3, includes: a second spur gear 93a fixed to the second rotating shaft 92a of the second rotating drum 92, the exhaust control cam 93b integrally formed with the third camshaft 60; an exhaust control rod 93c elastically biased by, for example, a coil spring such that one end is in contact with the exhaust control cam 93b, and linearly moved by the rotation of the third camshaft 60; and a second rack gear 93d integrally formed at the other end of the exhaust control rod 93c and engaged with the second spur gear 93a.

Accordingly, as the third camshaft 60 rotates, the exhaust control cam 93b integrally formed thereto rotates, the exhaust control rod 93c that is in close contact with the exhaust control cam 93b linearly moves with the second rack gear 93d at the end linearly moving, the second spur gear 93a fixed to the first rotation shaft 92a of the second rotating drum 92 is rotated alternately in both directions by the linear movement of the second rack gear 93d, and the second rotating drum 92 rotates between the second semi-circular plate 91 and the other side of the exhaust manifold 23, such that the combustion gas bypass pipe 70 communicates with the cylinder bock 10 and the combustion gas is re-circulated through the bypass pipe 70 in the exhaust stroke, while the exhaust manifold 23 communicates with the cylinder block 10 and combustion gas containing vapor is consequently discharge through the exhaust manifold 23 in the re-exhaust stroke.

FIG. 12 shows a stroke flowchart of the 8-stroke internal combustion engine according to the present invention. The entire operation of the 8-stroke internal combustion engine according to the present invention is schematically illustrated hereafter with reference to the accompanying drawings.

The 8-stroke internal combustion engine 1 according to the present invention, as shown in FIG. 12, generates power through total eight strokes, including: an intake stroke that takes a gas mixture or air into the cylinder block 10; a compression stroke that compresses the gas mixture or the air taken into the cylinder block by the intake stroke, by moving up the piston 11; an explosion stroke that ignites the gas mixture compressed by the compression stroke or makes explosive combustion by injecting fuel to the air compressed by the compression stroke; an exhaust stroke that discharges and re-circulates the combustion gas burned by the explosion stroke from the cylinder block 10 to the combustion gas bypass pipe 70; a re-intake stroke that makes the combustion gas re-circulated to the combustion gas bypass pipe 70 by the exhaust stroke flow again into the cylinder block 10; a re-compression stroke that recompresses the combustion gas re-taken into the cylinder block 10 by the re-intake stroke by moving up the piston 11; an expansion stroke that expanding volume due to evaporation of water by injecting the water to the combustion gas compressed at high temperature by the recompression stroke; and a re-exhaust stroke that consequently discharges the combustion gas containing vapor after the expansion stroke out of the cylinder block 10.

FIGS. 13 to 28 are flowcharts illustrating the order of entire operation of the 8-stroke internal combustion engine according to the present invention, in accordance with each 90° rotation angle of the crankshaft. Hereafter, the operation of the 8-stroke internal combustion engine according to the present invention is described for each stroke.

In the 8-stroke internal combustion engine 1 according to the present invention, it should be noted that the intake valves 22 are kept closed during the entire eight strokes, except for the intake stroke and the re-intake stroke, while the exhaust valves 24 are kept closed during the entire eight strokes, except for the exhaust stroke and the re-exhaust stroke. Further, the combustion gas intake controller 80 keeps the first communication pipe 82*b* communicating one side with the other side of the intake manifold 21 during the entire eight strokes, except for the exhaust stroke and the re-intake stroke, while the combustion gas exhaust controller 90 keeps the second communication pipe 92*b* communicating one side with the other side of the exhaust manifold 23 during the entire eight strokes, except for the exhaust stroke and the re-intake stroke.

Figure 13:
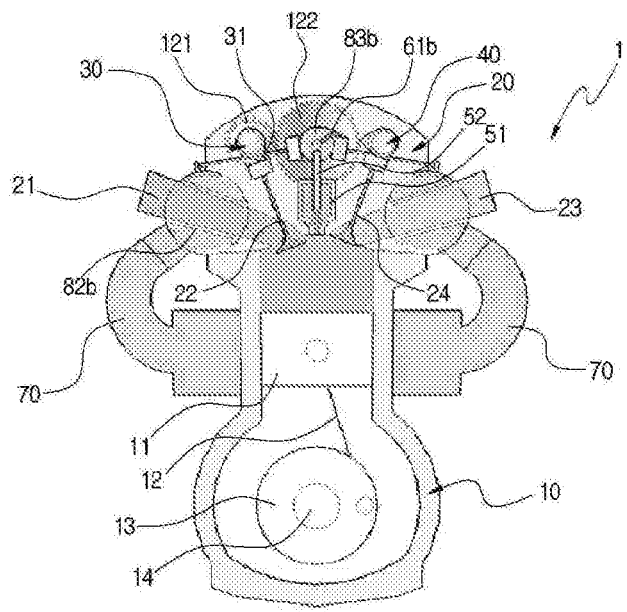
FIGS. 13 to 28 are flowcharts illustrating the order of entire operation of the 8-stroke internal combustion engine according to the present invention, in accordance with each 90° rotation angle of the crankshaft.
Figure 14:
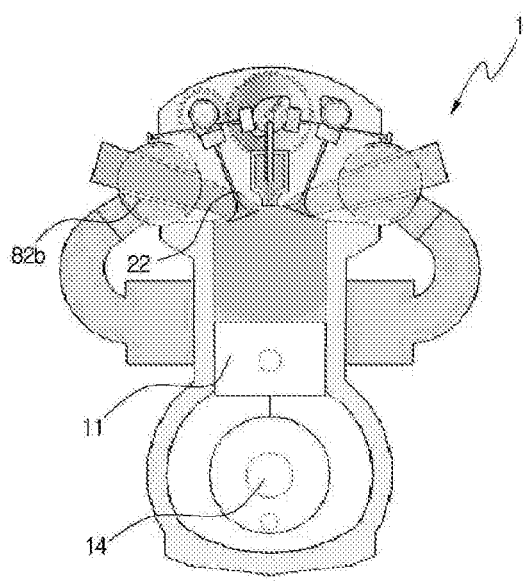

FIGS. 13 and 14 show the intake stroke, and during the intake stroke, the crankshaft 14 rotates from 0° to 180°, the first camshaft 30 and the second camshaft 40 are rotated from 0° to 90° with the rotation of the crankshaft 14 by the first power transmission mechanism 110, and the third camshaft 60 rotates from 0° to 45° with the rotation of the first camshaft 30 by the second power transmission mechanism 120.

The intake cams 31 integrally formed with the first camshaft 30 push down the intake valves 22 and the intake manifold 21 is opened while the crankshaft 14 rotates from 0° to 180°, a gas mixture of air can be taken into the cylinder block 10, the gas mixture or the air is taken into the cylinder block 10 and the exhaust valves 24 is kept closed while the piston 11 moves from the top dead center to the bottom dead center, such that the exhaust manifold 23 is kept closed. When the crankshaft 14 rotates at 180° and the piston 11 reaches the bottom dead center, the intake valves 22 return and the intake manifold 21 is closed again, thereby the intake stroke is completed.

Figure 15:
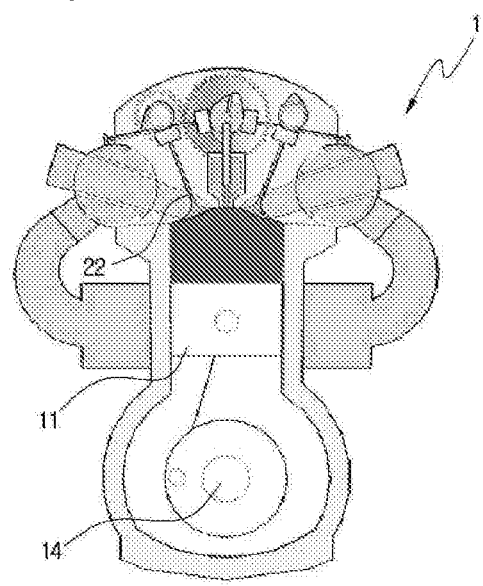
Figure 16:
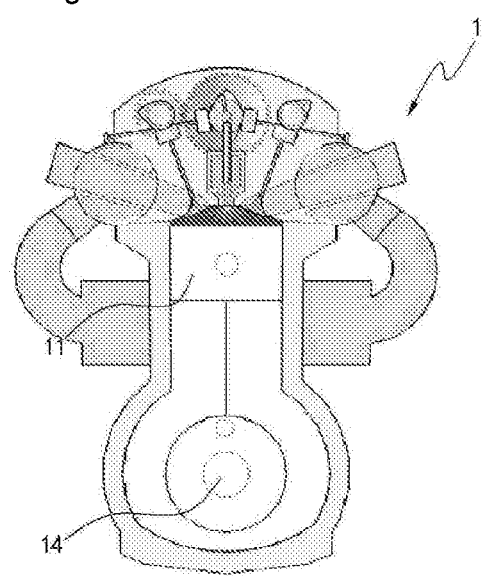

FIGS. 15 and 16 show the compression stroke, and during the compression stroke, the crankshaft 14 rotates from 180° to 360°, the first camshaft 30 and the second camshaft 40 are rotated from 90° to 180° with the rotation of the crankshaft 14 by the first power transmission mechanism 110, the third camshaft 60 is rotated from 45° to 90° with the rotation of the first camshaft 30 by the second power transmission mechanism 120.

While the crank shaft 14 rotates from 180° to 360°, the intake valves 22 are kept closed and the intake manifold 22 is kept closed, and the exhaust valves 24 are kept closed and the exhaust manifold 23 is kept closed, and the piston 11 compresses the gas mixture or the air in the cylinder block 10 while move from the bottom dead center to the top dead center.

Figure 17:
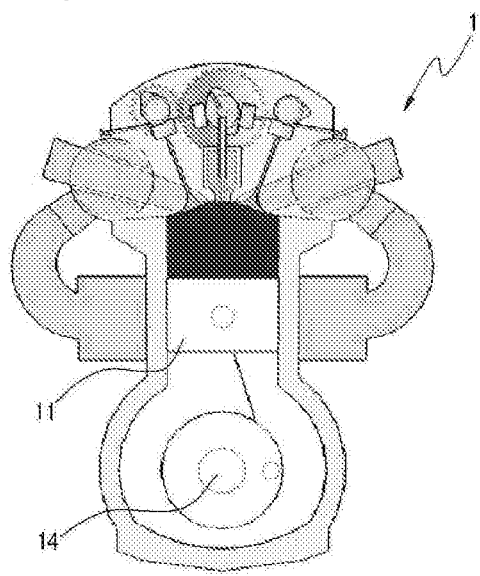
Figure 18:
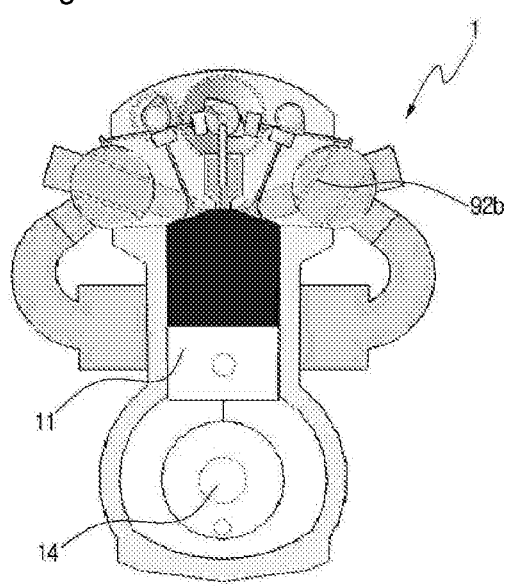

FIGS. 17 and 18 show the explosion stroke, and during the explosion stroke, the crankshaft 14 rotates from 360° to 540°, the first camshaft 30 and the second camshaft 40 are rotated from 180° to 270° with the rotation of the crankshaft 14 by the first power transmission mechanism 110, and the third camshaft 60 is rotated from 90° to 135° with the rotation of the first camshaft 30 by the second power transmission mechanism.

Flame is made by an ignition plug by a distributor (not shown) or fuel is injected through the fuel injector after the crankshaft 14 rotates to 360°, such that the compressed gas mixture or the air pushes down the piston 11 while explosively burning, this force is transmitted to the crank 13 through the connecting rod 12 and rotates the crankshaft 14, and consequently, the piston 11 moves from the top dead center to the bottom dead center while the crankshaft 14 rotates from 360° to 540°.

While the crankshaft 14 rotates from 360° to 540°, the intake valves 22 are kept closed and the intake manifold 22 is kept closed, and the exhaust valves 24 kept closed and the exhaust manifold 23 is kept closed.

Figure 19:
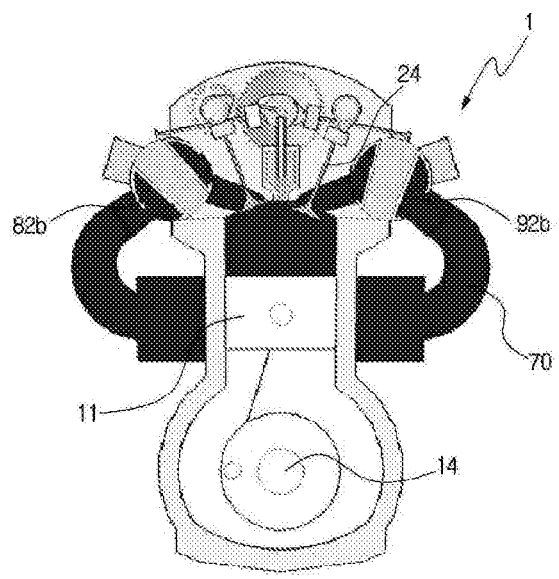
Figure 20:
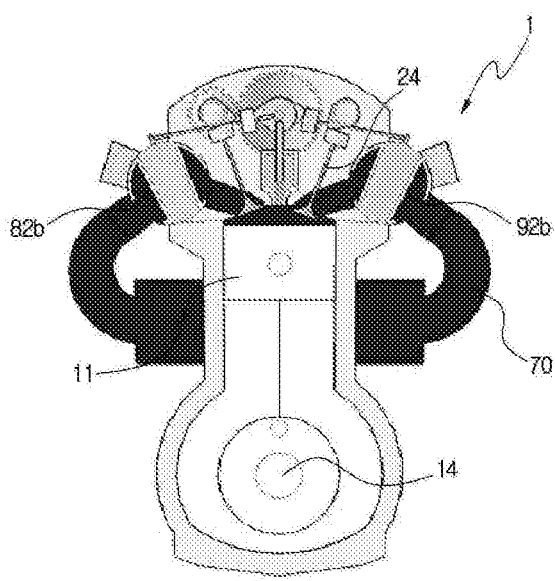

FIGS. 19 and 20 show the exhaust stroke, and during the exhaust stroke, the crankshaft 14 rotates from 540° to 720°, the first camshaft 30 and the second camshaft 40 are rotated from 270° to 360° with the rotation of the crankshaft 14 by the first power transmission mechanism 110, and the third camshaft 60 is rotated from 135° to 180° with the rotation of the first camshaft 30 by the second power transmission mechanism 120.

While the crankshaft 14 rotates from 540° to 720°, the intake valves 22 are kept closed and the intake manifold 22 is kept closed, the exhaust cams 31 integrally formed with the second camshaft 40 push down the exhaust valves 22 and the exhaust manifold 23 is opened, such that the combustion gas can be discharged from the cylinder block 10, and the piston 11 pushes and discharges the combustion gas while moving from the bottom dead center to the top dead center. When the crankshaft 14 rotates to 720°, the exhaust valves 24 return and the exhaust manifold 23 is closed again, there by completing the exhaust stroke.

In the exhaust stroke, as the intake control rod 83*c* is linearly moved by the intake control cam 83*b* integrally formed with the third camshaft 60, the first rotating drum 82 rotates, and as a result, the combustion gas intake controller 80 is kept communicating the combustion gas bypass pipe 70 with the other side of the intake manifold 21 through the first communication hole 82*c*. Further, as the exhaust control rod 93*c* is linearly moved by the exhaust control cam 93*b* integrally formed with the third camshaft 60, the second rotating drum 92 rotates, and as a result, the combustion engine controller 90 is kept communicating the combustion gas bypass pipe 70 with the other side of the exhaust manifold 23 through the second communication hole 92*c*.

Therefore, the combustion gas discharged from the cylinder block 10 by the exhaust stroke in not discharged through the exhaust manifold 23, but re-circulated through the combustion bypass pipe 70.

Figure 21:
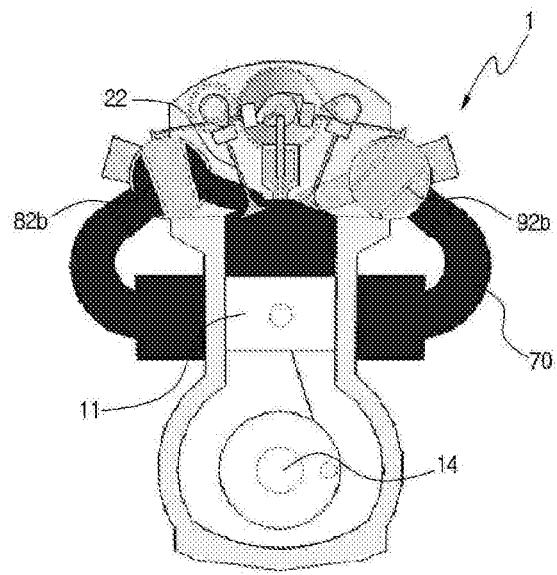
Figure 22:
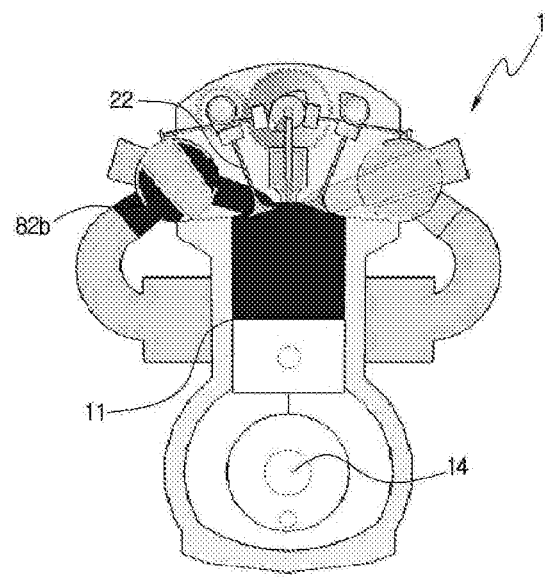

FIGS. 21 and 22 show the re-intake stroke, and during the re-intake stroke, the crankshaft 14 rotates from 720° to 900°, the first camshaft 30 and the second camshaft 40 are rotated from 360° to 450° with the rotation of the crankshaft by the first power transmission mechanism 110, and the third camshaft 60 is rotated from 180° to 225° with the rotation of the first camshaft 30 by the second power transmission mechanism 120.

While the crankshaft 14 rotates from 720° to 900°, the intake cams 31 integrally formed with the first camshaft 30 push down the intake valves 22 and the intake manifold 21 is opened, such that the combustion gas re-circulated through the combustion gas bypass pipe 70 can be re-taken into the cylinder block 10, and the combustion gas is re-taken into the cylinder block 10 and the exhaust valves 24 are kept closed while the piston 11 moves from the top dead center to the bottom dead center, such that the exhaust manifold 23 is kept closed. When the crankshaft 14 rotates to 900° and the piston 11 reaches the bottom dead center, the intake valves 22 return and the intake manifold 21 is closed again, thereby completing the re-intake stroke.

After the re-intake stroke is completed, as the intake control rod 83c returns while being linearly moved in the opposite direction by the intake control cam 83b integrally formed with the third camshaft 60, the first rotating drum 82 rotates, and as a result, the combustion gas intake controller 80 is converted into the initial state such that the first communication hole 82b communicates one side with the other side of the intake manifold 21. Further, as the exhaust control rod 93c returns while being linearly moved in the opposite direction by the exhaust control cam 93b integrally formed with the third camshaft 60, the second rotating drum 92 rotates, and as a result, the combustion gas exhaust controller 90 is converted to the initial state such that the second communication hole 92b communicates one side with the other side of the exhaust manifold 23.

Figure 23:
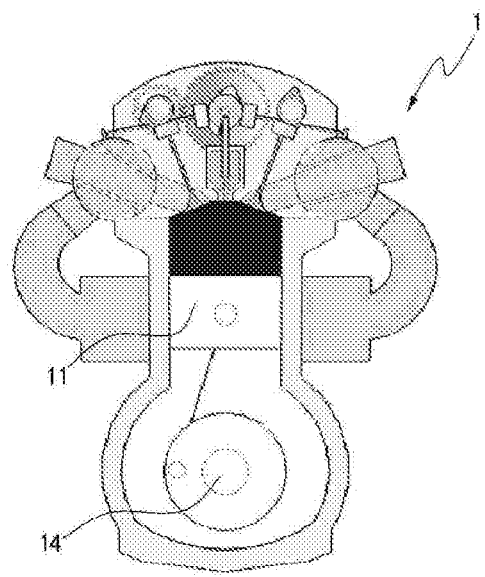
Figure 24:
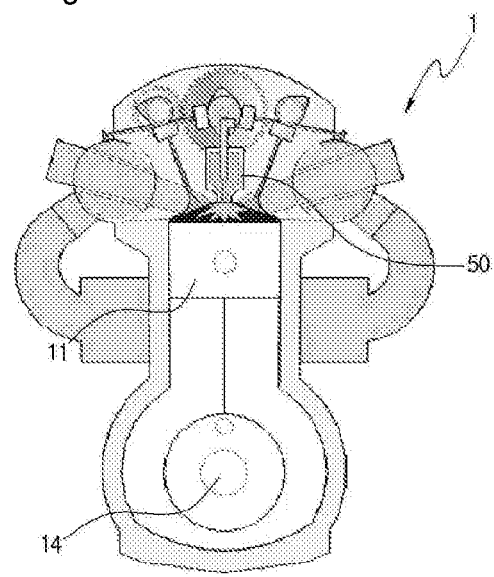

FIGS. 23 and 24 show the recompression stroke, and during the recompression stroke, the crankshaft 14 rotates from 900° to 1080°, the first camshaft 30 and the second camshaft 40 are rotated from 450° to 540° with the rotation of the crankshaft by the first power transmission mechanism 110, and the third camshaft 60 is rotated from 225° to 270° with the rotation of the first camshaft 30 by the second power transmission mechanism 120.

While the crankshaft 14 rotates from 900° to 1080°, the intake valves 22 are kept closed and the intake manifold 22 is kept closed, the exhaust valves 24 are also kept closed and the exhaust manifold 23 is kept closed, and the piston recompresses the combustion gas in the cylinder block 10 while moving from the bottom dead center to the top dead center.

Figure 25:
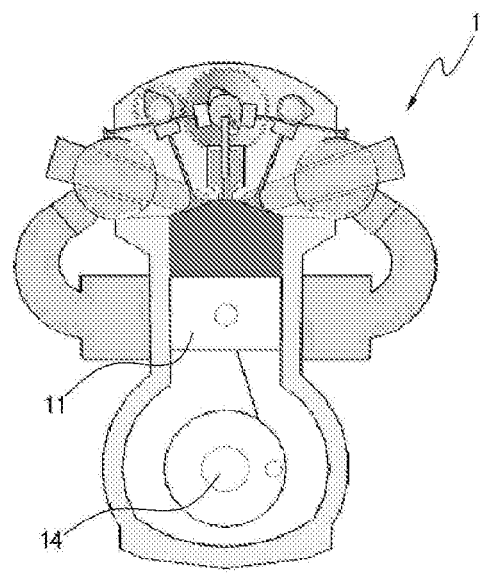
Figure 26:
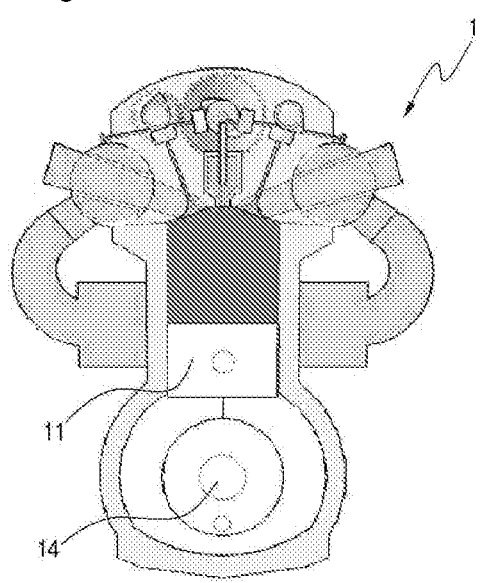

FIGS. 25 and 26 show the expansion stroke, and during the expansion stroke, the crankshaft 14 rotates from 1080° to 1260°, the first camshaft 30 and the second camshaft 40 are rotated from 540° to 630° with the rotation of the crankshaft by the first power transmission mechanism 110, and the third camshaft 60 is rotated from 270° to 315° with the rotation of the first camshaft 30 by the second power transmission mechanism 120.

When the crankshaft 14 rotates to 1080° and the combustion gas is recompressed, the inside of the cylinder block is maintained at high temperature and the combustion gas is compressed at high pressure by heat due to the explosion stroke and heat from the combustion gas.

In this process, as the trigger 61b of the intake control cam 83b pushes the protrusion 61a and the water injection unit 50 is operated, water is injected into the cylinder block 10, and the injected water moves down the piston 11 to the bottom dead center while explosively evaporating and expanding in the high-temperature and high-pressure cylinder block 10, such that rotational power for the crankshaft 14 is generated.

While the crankshaft 14 rotates from 1080° to 1260°, the intake valves 22 are kept closed and the intake manifold 22 is kept closed, and the exhaust valves 24 are also kept closed and the exhaust manifold 23 is kept closed.

Figure 27:
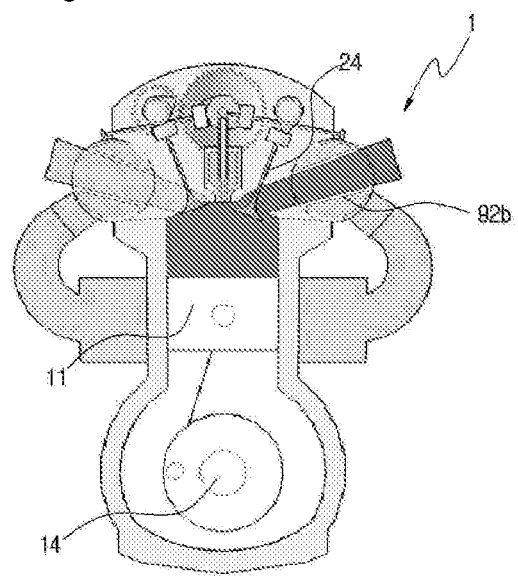

FIG. 27 shows the re-exhaust stroke, and during the re-exhaust stroke, the crankshaft 14 rotates from 1260° to 1440°, the first camshaft 30 and the second camshaft 40 are rotated from 630° to 720° with the rotation of the crankshaft by the first power transmission mechanism 110, and the third camshaft 60 is rotated from 315° to 360° with the rotation of the first camshaft 30 by the second power transmission mechanism 120.

Figure 28:
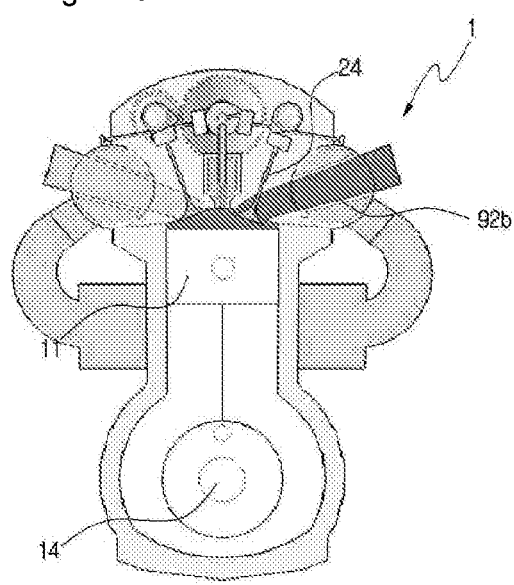

While the crankshaft 14 rotates from 1260° to 1440°, the intake valves 22 are kept closed and the intake manifold 21 is kept closed, the exhaust cams 41 integrally formed with the second camshaft 40 push down the exhaust valves 24 and the exhaust manifold 23 is opened, such that combustion gas containing vapor can be discharged from the cylinder block 10, and the piston 11 pushes the combustion gas containing vapor and consequently discharges the combustion gas through the exhaust manifold 23 while moving from the bottom dead center to the top dead center. When the crankshaft 14 rotates to 1440°, as shown in FIG. 28, the exhaust valve 24 return and the exhaust manifold 23 is closed again, thereby completing the re-exhaust stroke.

With completion of the re-exhaust stroke, the entire 8-stroke cycle is completed, and simultaneously, the 8-stroke internal combustion engine 1 according to the present invention returns, as shown in FIG. 13, and power is generated by repeating the 8-stroke cycle.

During the entire eight strokes in the 8-stroke internal combustion engine 1 according to the present invention, the crankshaft 14 rotates at 1440° (four-time rotation), the first camshaft 30 and the second camshaft 40 are rotated at 720° (two-time rotation) with the rotation of the crankshaft 14 by the first power transmission mechanism 110, and the third camshaft 60 is rotated at 360° (one-time rotation) with the rotation of the first camshaft 30 by the second power transmission mechanism 120.

INDUSTRIAL APPLICABILITY

When an 8-stroke internal combustion engine is applied to vehicles, power is generated by four strokes due to combustion of the fuel and four strokes due to evaporation and expansion of injected water which are alternately repeated, such that it is possible to considerably increase fuel efficiency in comparison with 4-stroke or 6-stroke internal combustion engines in the related art. Further, the same power as the four strokes due to the evaporation and the expansion of the injected water is generated in the four strokes due to the combustion of the fuel, by re-circulating, re-taking, and recompressing the combustion gas and then injecting the water, right after the four strokes due to the combustion of the fuel. Therefore, it is possible to continuously generate a predetermined level of power, even if the four strokes due to the combustion of the fuel and the four strokes due to the evaporation and expansion of the injected water are repeated. Furthermore, it is possible significantly increase thermal efficiency by collecting waste heat from the combustion gas by re-circulating the combustion gas right after the four strokes due to the combustion of the fuel. Further, since the water injection unit, which operates with rotation of the crankshaft, injects water only when the re-circulated combustion gas is compressed, by using relatively simple mechanism, it is possible to prevent malfunction and considerably increase reliability in water injection timing.

The invention claimed is:
1. An 8-stroke internal combustion engine, comprising:
   a cylinder block in which rotational power is generated by
      a crankshaft rotated by up-down reciprocation of a piston that is transmitted through a connecting rod;
   a cylinder head connected to the top of the cylinder block
      and having one side connected with an intake manifold opened/closed by intake valves and the other side connected with exhaust manifolds opened/closed by an exhaust valve;

a first camshaft arranged above the cylinder head, rotating with the rotation of the crankshaft, and having integral intake cams operating the intake valves;

a second camshaft arranged above the cylinder head, rotating with the rotation of the crankshaft, and having integral exhaust cams operating the exhaust valves;

a water injection unit disposed above the cylinder head and injecting water into the cylinder block;

a third camshaft arranged above the cylinder head, rotating with the rotation of the first camshaft, and having an injection mechanism operating the water injection unit;

combustion gas bypass pipes connecting the intake manifold with the exhaust manifold;

a combustion gas intake controller disposed in the intake manifold and connected with the combustion gas bypass pipe to selectively control intake of a gas mixture or air or re-intake of combustion gas; and a combustion gas exhaust controller disposed in the exhaust manifold and connected with the combustion gas bypass pipe to selectively control exhaust or re-circulation of combustion gas.

2. The 8-stroke internal combustion engine according to claim 1, wherein an ignition plug or a fuel injector is disposed at the center of the cylinder head.

3. The 8-stroke internal combustion engine according to claim 2, wherein the first camshaft and the second camshaft are rotated with the rotation of the crankshaft by a first power transmission mechanism including a first sprocket fixed to the crankshaft, a second sprocket fixed to the first camshaft, a third sprocket fixed to the second camshaft, and a power chain linking the sprockets.

4. The 8-stroke internal combustion engine according to claim 3, wherein as the second and third sprockets rotate one time for two-time rotation of the first sprocket, the first camshaft and the second camshaft rotate one time with two-time rotation of the crankshaft.

5. The 8-stroke internal combustion engine according to claim 4, wherein the third camshaft is rotated with the rotation of the first camshaft by a second power transmission mechanism including a first gear fixed to the first camshaft and a second gear fixed to the third camshaft and engaged with the first gear.

6. The 8-stroke internal combustion engine according to claim 5, wherein as the second gear rotates one time for two-time rotation of the first gear, the third camshaft is rotated one time with two-time rotation of the first camshaft.

7. The 8-stroke internal combustion engine according to claim 6, wherein the combustion gas intake controller includes: a first semicircular plate fixed to one side of the intake manifold;

a first rotating drum rotatably fitted on a first rotating shaft while being externally tangent between the first semicircular plate and the other side of the intake manifold, having a first communicating pipe therein for selectively communication both sides of the intake manifold in accordance with the rotational direction, and having first communication holes selectively communicating the combustion bypass pipe with the other side of the intake manifold in accordance with the rotational direction, through the outer circumference; and a first actuator rotating the first rotating drum by rotating the first rotating shaft of the first rotating drum.

8. The 8-stroke internal combustion engine according to claim 7, wherein the first actuator includes:

a first spur gear fixed to the first rotating shaft of the first rotating drum;

an intake control cam integrally formed with the third camshaft;

an intake control rod elastically biased by a coil spring such that one end is in contact with the intake control cam, and linearly moved by the rotation of the third camshaft; and a first rack gear integrally formed at the other end of the intake control rod and engaged with the first spur gear.

9. The 8-stroke internal combustion engine according to claim 8, wherein the combustion gas exhaust controller includes;

a second semicircular plate fixed to one side of the exhaust manifold and communication with the combustion gas bypass pipe;

a second rotating drum rotatably fitted on a second rotating shaft while being externally tangent between the second semicircular plate and the other side of the exhaust manifold, having a second communicating pipe therein for selectively communication both sides of the exhaust manifold in accordance with the rotational direction, and having second communication holes selectively communicating the combustion bypass pipe with the other side of the exhaust manifold in accordance with the rotational direction, through the outer circumference; and a second actuator connected to the second rotating shaft and rotating the second rotating drum.

10. The 8-stroke internal combustion engine according to claim 9, wherein the second actuator includes;

a second spur gear fixed to the second rotating shaft of the second rotating drum; the exhaust control cam integrally formed with the third camshaft;

an exhaust control rod elastically biased by a coil spring such that one end is in contact with the exhaust control cam, and linearly moved by the rotation of the third camshaft; and a second rack gear integrally formed at the other end of the exhaust control rod and engaged with the second spur gear.

11. The 8-stroke internal combustion engine according to claim 8, wherein the water injection unit includes:

an injection cylinder disposed on the cylinder head and having one side connected with a water supply and having the lower end where an injection nozzle is disposed; and a nozzle opening/closing rod rotatably combined with the injection cylinder and elastically biased in the closing direction of the injection nozzle while rotating to close the injection nozzle with operation of a water injection operating mechanism.

12. The 8-stroke internal combustion engine according to claim 11, the water injection operating mechanism has a protrusion protruding from one side of the top of the nozzle opening/closing rod and a trigger formed on the intake control cam and rotating the nozzle opening/closing rod by pushing the protrusion in accordance with the rotation of the intake control cam.

13. The 8-stroke internal combustion engine according to claim 12, wherein the trigger rotates the nozzle opening/closing rod to open the injection nozzle, after re-intake and recompression of the re-circulated combustion gas is completed in the cylinder block.

* * * * *